United States Patent Office 3,454,705
Patented July 8, 1969

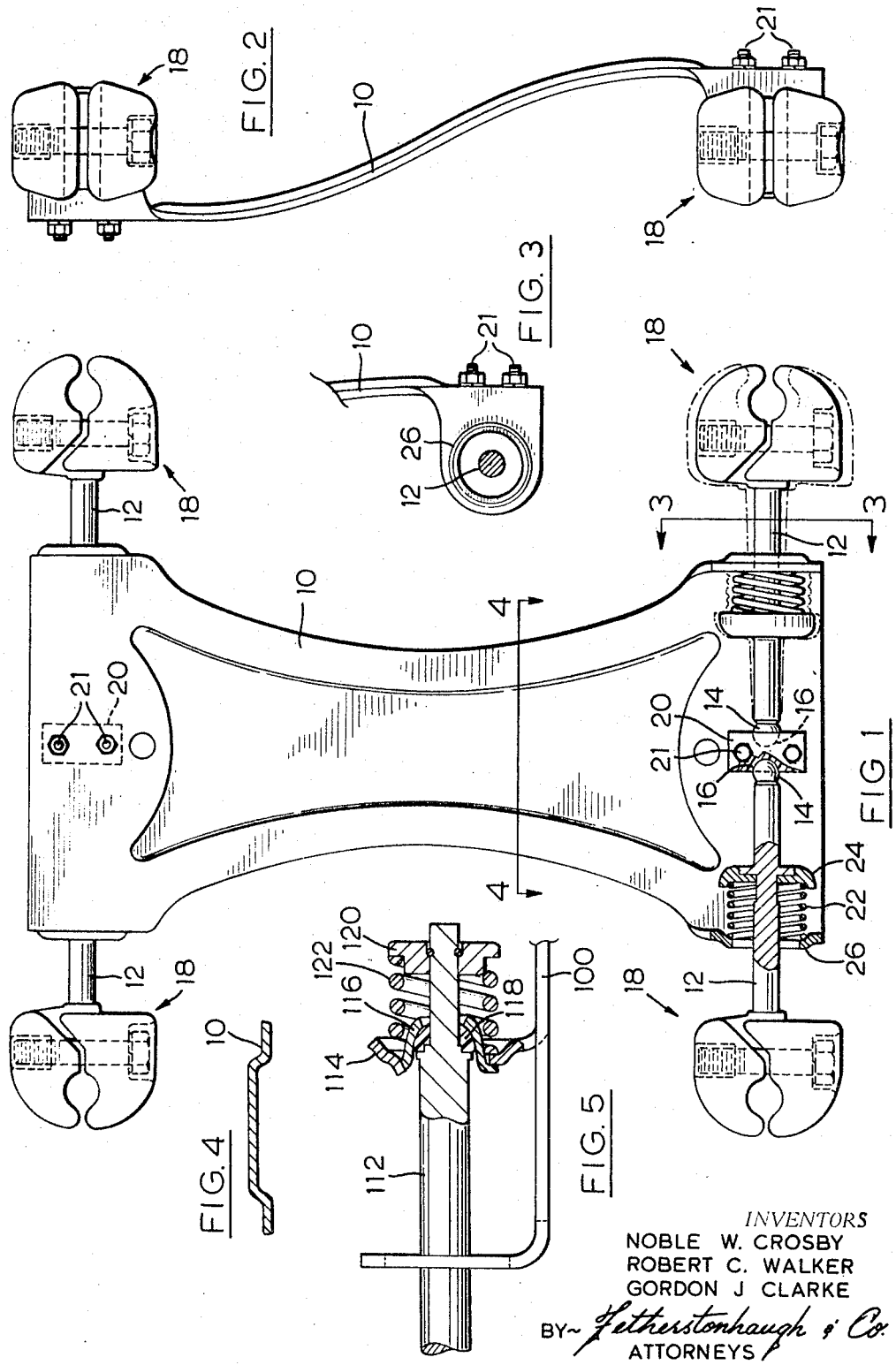

3,454,705
SPACER DAMPER
Noble W. Crosby, Trenton, Ontario, Gordon J. Clarke, Bramalea, Ontario, and Robert C. Walker, Newmarket, Ontario, Canada, assignors to Lacal Industries Limited, Newmarket, Ontario, Canada
Filed Mar. 25, 1968, Ser. No. 715,734
Int. Cl. H02g 7/14, 7/12
U.S. Cl. 174—42    6 Claims

ABSTRACT OF THE DISCLOSURE

This invention relates to a specer damper for holding electricity transmission wires in spaced apart relation and for damping aeolian vibration of the transmission wires due to wind. The device has a frame and arms connected to the frame. The electricity conducting wires are held in clamps at the end of the arms. The damping aspect of the invention is achieved by the dissipation of the energy of vibration in friction at a mechanical joint between the arms and the frame. A spring extends around the arms in spaced apart relation thereto to urge them towards the frame and impart the frictional resistance between the arm and the frame that dampens the vibration.

---

This invention relates to a damper for damping wind induced vibration, such as aeolian vibration, in a cable conductor, such as an electricity conducting line. The invention has special application to damper assemblies for bundle conductor electricity transmission lines.

It is common to transmit electricity over bundle conductors wherein the individual conductors are retained in spaced relation by means of bundle suspension brackets at the towers and bundle spacers between the towers.

It is also common practice to provide means for damping aeolian vibration of the conductors due to wind. Various forms of dampers have been used and many are similar in the sense that they dissipate the energy of the conductor vibration in a twisting of the conductor and/or by flexing a resilient means externally of the conductor. Some mechanical forms of dampers are superior mechanically and operate with greater efficiency than others.

It is an object of this invention to provide a new damper assembly for damping aeolian vibration that is rugged, easy to manufacture and efficient in damping aeolian vibration.

It is a further object of this invention to provide a spacer damper which, in addition to having means for damping aeolian vibration, has means for limiting movement of the conductor cable carrying brackets under conditions of abnormally high loading, such as icing, short circuit loads and the like.

With these and other objects in view, a spacer damper assembly for a bundle conductor according to this invention comprises a frame, a plurality of rigid arms, mechanical connecting means frictionally connecting each of said arms with said frame for forced vibration about an equilibrium position, a conductor cable bracket on a free end of each of said arms, said arms in said equilibrium position being adapted to support conductor cables in spaced apart operative position, a resilient member having its longitudinal axis aligned with the longitudinal axis of its respective arm and extending around its respective arm in spaced relation thereto, means on said frame and cooperating means on each of said arms for stressing said damping means to exert an axial thrust on its respective arm whereby to introduce frictional forces at said mechanical connecting means adapted to dampen forced vibration of its respective arm and to normally urge its respective arm to said equilibrium position.

The invention will be clearly understood after reference to the following detailed specification read in conjunction with the drawings.

In the drawings:

FIGURE 1 is a front view of a spacer damper assembly having a damping means according to this invention;

FIGURE 2 is a side view of FIGURE 1;

FIGURE 3 is a partial view taken along the line 3—3 of FIGURE 1;

FIGURE 4 is a view taken along the line 4—4 of FIGURE 1; and

FIGURE 5 is a view illustrating an alternative construction for the mechanical connecting means between the frame and the arms that carry the brackets.

Referring to the drawings and initially to FIGURES 1 to 4 thereof, the spacer damper there shown has a frame 10 made from stamped steel and four rigid arms 12. Each of the arms 12 is connected with the frame 10 by means of a ball 14 and socket 16 joint and has a conductor cable clamp, generally indicated by the numeral 18, at its free end.

The socket 16 of each ball and socket joint is formed in a block of plastic material 20, such as Teflon resin impregnated with glass fibers, that is bolted to the stamped steel frame 10 by means of bolts 21. Damping in use is achieved through the action of a coil spring 22, which is compressed between the shoulder 24 carried on arm 12 and flange 26 on the frame 10 to exert an axial thrust on the arm 12 to urge the polished steel ball of arm 12 into the socket 16 and establish a frictional bearing between the two that in use dampens the forced vibration of the arm transversely about its equilibrium position as the arm tends to follow aeolian vibration of a conductor cable mounted in the bracket 18 thereof. It will be noted that spring 22 extends around a portion of the longitudinal extent of the arm 12 in spaced relation thereto and normally urges the arm into the solid line equilibrium position. It will also be apparent that, by reason of this arrangement, the spring will tend to return the arm to the equilibrium position when an applied force moves arm transversely about the equilibrium position, as occurs with aeolian vibration.

In use, as well be explained later, the arms 12 will vibrate in a vertical direction transversely of the solid line position under the influence of aeolian vibration. It will be noted that the arms 12 pass through an oversized hole in flange 26. This hole has a size that is larger than that necessary to accommodate movement due to aeolian vibration. It permits movement of the arms caused by aeolian vibration but is also designed to limit the greater movement of the arms under abnormal loads tending to move them from the normal position, such as loads that will be impressed upon the arms due to extreme condition of icing or stresses encountered on a short circuit of the conductor line.

FIGURE 5 illustrates a modified mechanical connecting means between the arms 112, which are the equivalent to arms 12 in the embodiment of FIGURE 1, and the frame 100, which is the equivalent of the frame 10 in FIGURE 1. This means of connecting and stressing arms could be used in the bracket of FIGURES 1 to 4. In this case, the portion of the frame 100, where the arms are mounted, is formed with an upstanding lug 114 that has a hole therein that supports a cup 116 at its marginal edges. Cup 116 is stainless steel and is formed as a socket for a plastic ball 118 that is in turn carried by the arm 112. The disc 120, carried by the free end of the arm 112, cooperates with the marginal portion of the hole in the lug 114 to compress the spring 122 to exert an axial thrust on the arm 112 to introduce frictional forces at the ball and socket joint 116 and 118 to dampen aeolian vibration in use and to normally urge the arm to anequilibrium position. Plastic ball 118 is made from a suitable plastic such as Teflon resin impregnated with glass fibers.

Arm 112 has a clamp for a conductor at its free ends similar to the clamp 18 and the mechanical connection of FIGURE 5 would be incorporated at each of the four arms in the case of a four conductor bundle bracket shown in FIGURES 1 to 4.

The spacer assembly illustrated is about 18 inches high between centres of the clamps 18 and the diameter of the holes in the brackets 26 is about one and a half inches. This provides for a one inch deflection of the clamps 18 on the ends of the arms 12 from the normal equilibrium position under extreme loading conditions.

The spacer damper assembly illustrated is used on a four conductor bundle transmission line. In such a transmission line, the conductors are suspended by means of suspension brackets from spaced apart towers by means of suspension brackets that hold the conductors in a quadded arrangement similar to that of the spacer damper illustrated. Between the suspension brackets, it is necessary to provide a spacer, and the spacer illustrated in this specification is mounted on the line, each of the clamps engaging a conductor to maintain the four conductors of the line in quadded arrangement. This is standard practice insofar as the use of suspension brackets and spacers is concerned. The spacer of this invention, in addition to spacing the conductors, is also adapted to dampen aeolian vibration.

Aeolian vibration is generally considered to result from a comparatively steady wind blowing across an overhead conductor. In such a case vortices are detached at regular intervals on the lee side of the conductor alternately from the top and bottom portions. The detachment is accompanied by a minute vertical force. The conductor is thus repeatedly subjected to forces that are alternately impressed from above and below.

If the frequency of the forces corresponds approximately to the natural frequency of the span of the conductor between clamps on adjacent spacer damper assemblies, or one of the harmonics of the natural frequency of the span, then the conductor will tend to vibrate with an aeolian vibration. The forces impressed by the wind on the conductor tend to produce travelling waves that move away from the point of application of the forces toward the end of the span. The crest and trough of each wave stores part of the energy it receives from the wind during the course of its travel in the form of increased amplitude. Part of the energy is dissipated in the conductor and part of it is dissipated in a damping device, if a damping device is used, but the vibration amplitude increases until an equilibrium between power input and power dissipation is reached. Damping devices are used to dissipate power and minimize the vibration amplitude.

When the conductors in clamps 18 tend to vibrate with aeolian vibration, the arms 12 upon which they are mounted vibrate transversely about the equilibrium position, as illustrated by the solid line construction of the lower right arm 12 of FIGURE 1 wherein the solid line illustrates the equilibrium or normal position and the broken lines indicate positions of transverse vibration about the equilibrium position. The frame 10 by reason of its effective weight which, in use, will be a function of the conductors that are mounted therein, does not appreciably follow the movement of the conductors. Thus, there is relative movement between the spacer damper assembly frame and the conductors whereby torque is applied to the conductors along their axes. The conductors are stranded construction and the application of this torque alternately loosens and tightens the lay of the strands of the conductors with the consequent dissipation of energy. This has a dampening effect on the vibration. The functioning of a spacer damper assembly in this way is not broadly new. Many spacer damper assemblies dissipate a certain amount of the energy of aeolian vibration by twisting the conductor cables, as indicated. The novelty of this invention resides in the manner of dissipating other portions of the energy of aeolian vibration in a mechanical joint between the arm 12 and the frame 10 as aeolian vibration takes place.

The frictional forces introduced at this mechanical ball and socket joint dampen the forced vibrations applied to the end of the arm 12 by the vibrating conductor cable held in the clamp 18 as it vibrates under the influences of aeolian vibration.

The compression strength of spring 22 must be great enough to achieve adequate frictional force to dissipate energy of aeolian vibrations but must not be so great that it cannot be overcome to vibrate the arm transversely about the equilibrium position as a consequence of aeolian vibration. Substantial portions of the energy of aeolian vibration are dissipated in friction between the ball 14 and socket 16 of the ball and socket joint between the end of the arm 12 and the body of plastic material 20.

It has been found that a compressive force of about 110 pounds for the spring 22 introduces forces at the ball and socket 14 and 16 that reduce substantially aeolian vibration. These things, however, are matters of design and will vary from application to application. They are a function of many things, such as the weight of the line, the co-efficient of friction between the ball and socket 16 the weight of the conductor and other things.

It will be apparent that embodiments of the invention other than the ones illustrated are possible. Other forms and arrangement of the resilient member, for example, are possible. The essential feature in this respect is a resilient member that is capable of exerting an axial thrust on the arm 12 from a position surrounding the arm 12 to introduce frictional forces at a mechanical connecting means for frictionally connecting the arm with the frame about which the arm can vibrate about the equilibrium position. The materials and form of the frictional connection between the arms and the frame is variable, the essential thing here being that the joint when articulated under the influence of aeolian vibration should, under the influence of the stressed spring, dissipate by way of friction a substantial part of the energy of the vibration.

The invention could also be used with spacers designed to space bundles other than the four conductor bundle indicated. The conductor bundle, for example, may be composed of two conductors or other arrangements.

What we claim as our invention is:

1. A spacer damper assembly comprising a frame, a plurality of rigid arms, mechanical connecting means frictionally connecting each of said arms with said frame for forced vibration about an equilibrium position, a conductor cable bracket on a free end of each of said arms, said arms in said equilibrium position being adapted to support conductor cables in spaced apart position, a resilient member for each of said arms having its longitudinal axis aligned with the longitudinal axis of its respective arm and extending around its respective arm in spaced relation thereto, means on said frame and cooperating means on said arms stressing said resilient members to exert an axial thrust on their respective arms whereby to introduce frictional force at said mechanical connecting means adapted to dampen forced aeolin vibration of said arms and to normally urge said arms to their equilibrium position.

2. A spacer damper assembly, as claimed in claim 1, in which said resilient member is a coil spring.

3. A spacer damper assembly, as claimed in claim 2, in which said coil spring is compressed.

4. A spacer damper assembly, as claimed in claim 3, in which said mechanical connecting means is a ball and socket connection.

5. A spacer damper assembly, as claimed in claim 2, in which said mechanical connecting means is a ball and socket connection.

6. A spacer damper assembly, as claimed in claim 1, in which said mechanical connecting means is a ball and socket connection.

References Cited

UNITED STATES PATENTS

| | | |
|---|---|---|
| 1,166,752 | 1/1916 | Finizio. |
| 2,412,852 | 12/1946 | Wood. |
| 3,303,263 | 2/1967 | Myers 174—42 |

FOREIGN PATENTS 363,692   9/1962   Switzerland.

LARAMIE E. ASKIN, *Primary Examiner.*

U.S. Cl. X.R.

174—146